United States Patent
Busschbach et al.

(10) Patent No.: US 6,202,170 B1
(45) Date of Patent: Mar. 13, 2001

(54) EQUIPMENT PROTECTION SYSTEM

(75) Inventors: Peter B. Busschbach, New York, NY (US); Michael L. Steinberger, Issaquah, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/121,148

(22) Filed: Jul. 23, 1998

(51) Int. Cl.[7] ................................................ G60F 11/00
(52) U.S. Cl. .............................. 714/11; 714/4; 370/219
(58) Field of Search ................................ 714/1, 11, 13, 714/4; 370/219, 220

(56) References Cited

U.S. PATENT DOCUMENTS

| | | | | |
|---|---|---|---|---|
| 4,455,645 | * | 6/1984 | Mijioka ................................. | 370/220 |
| 5,193,086 | * | 3/1993 | Satomi ................................. | 370/228 |
| 5,313,456 | * | 5/1994 | Sugawara ............................. | 370/228 |
| 5,581,542 | * | 12/1996 | Kato .................................... | 370/219 |
| 5,796,718 | * | 8/1998 | Caterisano ........................... | 370/217 |
| 5,926,102 | * | 7/1999 | Chun ................................... | 340/826.16 |

* cited by examiner

Primary Examiner—Robert Beausoleil
Assistant Examiner—Bryce P. Bonzo
(74) Attorney, Agent, or Firm—Steve Mendelsohn

(57) ABSTRACT

A system provides automatic protection switching in case of failure or degradation in a function. For example, a system node may have a working server function, a protection server function, one or more client functions, and a control function. In its baseline configuration, the working server function is active, meaning that it is operating on-line with respect to the client functions, while the protection server function is standby, meaning that it is either inactive (i.e., cold standby) or operating off-line with respect to the client functions (i.e., hot standby). The control function monitors the operations of the working server function, and, if a failure or degradation is detected, or if an externally generated switch command is received, the control function will (1) instruct the working server function to change its status from active to standby and (2) instruct the protection server function to change its status from standby to active. In addition, the control function instructs each server function about a protection switch override condition. Each server function communicates its active/standby status as well as the override condition to the client functions (e.g., using in-band signaling). In addition to monitoring the active/ standby status and the override condition transmitted from each server function, each client function also performs its own independent monitoring of the status of the server functions to detect failures or other degradation in the server functions. Each client function then applies a specific set of rules to this information to determine which server function to select for its operations. The set of rules are designed to handle race conditions and other ambiguous states.

39 Claims, 8 Drawing Sheets

EQUIPMENT PROTECTION SYSTEM

BACKGROUND OF THE INVENTION

1. Field of the Invention

The present invention relates to the design of computer systems, and, in particular, to computer system architectures that provide automatic protection switching from active functions to standby functions to maintain uninterrupted system operations.

2. Description of the Related Art

In certain computer systems, it is important to maintain uninterrupted system operations, even in the event of catastrophic failure of one or more of the functions of those systems. For example, a switch node in a telecommunication system may be responsible for receiving, routing, and re-transmitting a large number of signals to support telecommunications between many pairs of end users of the system. The switch node may consist of a number of circuit boards operating together to support the overall signal switching operations of the node.

FIG. 1 shows a block diagram of a switch node 100 for a telecommunication system. Switch node 100 comprises working switch function 102 connected to a plurality of working port functions 104. Each working port function 104 provides the interface between working switch function 102 and the rest of the telecommunication system for a particular subset of the signals that are routed by working switch function 102. Depending on the implementation, each working switch and port function may be implemented on a separate circuit board.

In order to maintain uninterrupted telecommunication services to the various end users, it is desirable to provide a hardware design that enables switch node 100 to continue to operate even if one of the working circuit boards fails or otherwise begins to operate in a degraded manner. This may be achieved by providing an additional switch circuit board as a protection (i.e., backup) switch function and an additional port circuit board as a protection port function. If working switch function 102 fails, the protection switch function can assume its switch operations. Likewise, if any one of the working port functions 104 fails, the protection port function can assume its port operations. Such schemes are referred to as protection switching, where a protection function is switched on-line to assume the responsibilities of a failed working function. The word "switching" in the term "protection switching" refers to the switching of functions and is not related to the switching of signals provided by the switch functions in the telecommunication example of FIG. 1.

FIG. 2 shows a block diagram of a generic system 200 that provides protection switching in the event of function failure. In system 200, a working server function 202 communicates with client function 206 to support system operations. System 200 also has a protection server function 204, identical to working server function 202, as a backup in case working server function 202 fails to continue to operate properly. Protection server function 204 may be inactive (i.e., cold standby) or it may be operating off-line (i.e., hot standby). In addition, system 200 has control function 208, which monitors the operations of both working and protection server functions 202 and 204 for failures.

As used in this specification, the terms "server" and "client" are merely used to distinguish functions and are not intended to limit the types of operations performed by those functions. For example, referring to the switch node of FIG. 1, working server function 202 of FIG. 2 may be a working switch function, protection server function 204 may be a protection switch function, and client function 206 may be one of the port functions. In that case, FIG. 2 corresponds to protection switching provided for working switch function 102 in FIG. 1. Analogous protection switching may also be provided for working port functions 104.

According to one conventional equipment protection scheme, if a failure in working server function 202 is detected, control function 208 activates protection server function 204, if necessary (e.g., if protection server function 204 was in a cold standby mode), and directly instructs client function 206 via communication link 210 to switch its selection of which server function is active from working server function 202 to protection server function 204.

One drawback with this scheme is that it requires control function 208 to maintain knowledge of client function 206 and to communicate directly with client function 206. There are some applications in which a single server function may support a large number of client functions, each similar to client function 206 (e.g., where each client function is a port function as in FIG. 1). In such applications, control function 208 must maintain knowledge of a large number of client functions. Whenever the configuration of the client functions changes (e.g., a client function is added or deleted from the system), the database of information in control function 208 must be updated. In addition, unless the client functions are designed to transmit acknowledgment messages back to control function 208, control function 208 is never sure whether all of the client functions will have received its instructions. If, for example, a particular client function was temporarily off-line when protection switching instructions were sent, the client function would not have received the instructions, control function 208 would not know that the client function had not received the instructions, and, when the client function is brought back on-line, it will assume that the failed working server function 202 is still the active server function. Moreover, the requirement for control function 208 to communicate directly with each client function may cause a relatively long delay after a server function failure before all of the client functions can be instructed to switch to protection server function 204, which can result in an interruption of the overall system operations. For example, in a telecommunication system, under such circumstances, signals between one or more—and possibly all—pairs of end users may be dropped.

According to another equipment protection scheme, if control function 208 detects a failure in working server function 202, the control function 208 informs only server functions 202 and 204 of the need to switch from working server function 202 to protection server function 204. Server functions 202 and 204, in turn, notify the client functions of the need to switch to protection server function 204. This is typically implemented by each server function using in-band signaling in which a specific status bit in the overhead data communicated to each client function identifies whether or not the server function is active. Each client function monitors that status bit from each server function to determine whether to continue to operate with working server function 202 or to switch to protection server function 204. If a failure in working server function 202 causes all communications with the client functions to cease, the client functions will use the lack of signal from working server function 202 as an indication of the need to switch operations to protection server function 204. Under this equipment protection scheme, communication link 210 of FIG. 2 is not needed. This scheme alleviates many of the problems associated with requiring the control function to communicate directly with each client function. There are however possible situations, e.g., race conditions and other ambiguous states, that were not adequately addressed in this scheme.

SUMMARY OF THE INVENTION

The present invention is directed to an equipment protection scheme that addresses certain situations that were not covered by prior art equipment protection schemes. In one embodiment the present invention is a protection switching system, comprising (a) a client function; (b) a working server function, configured to communicate with the client function; (c) a protection server function, configured to communicate with the client function; and (d) a control function, configured to monitor the health of the working and protection server functions for failures and to implement protection switching from the working server function to the protection server function. Each of the working and protection server functions is configured to transmit to the client function (1) a status condition indicating whether the server function is active or standby and (2) an override condition. The client function is configured to monitor the health of the working and protection server functions and to implement protection switching from the working server function to the protection server function based on the health, the status condition, and the override condition for each of the working and protection server functions.

The present invention provides advantages over schemes that require the control function to notify each client function directly of a server failure. For example, the control function does not have to be aware of configuration changes made to the client functions. Furthermore, by allowing client functions to implement autonomous protection switching, protection switching can be implemented faster and more efficiently. The present invention handles race conditions and other ambiguous situations that were not addressed by previous schemes. In addition, the use of the additional override condition enables the control function to override normal client protection switch processing, for example, to implement forced protection switches.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
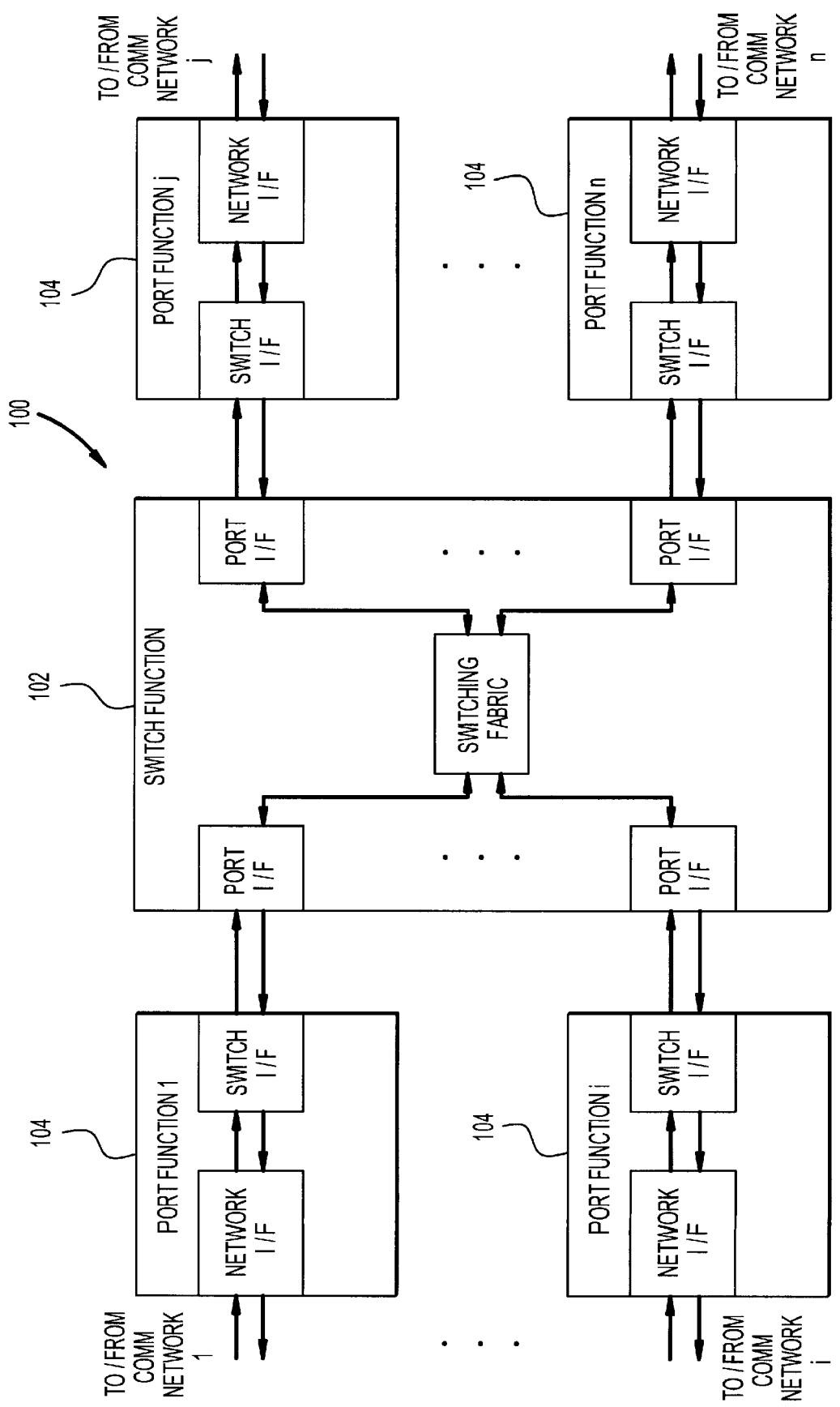
FIG. 1 shows a block diagram of a switch node for a telecommunication system.

The present invention is directed to protection switching systems that implement an equipment protection scheme. The term "protection" means that, for a certain function in a system, redundancy is provided so that failure of an active function will not lead to loss of the functionality, since the function can be taken over by a backup function. Equipment protection refers to the protection of functions within a network element or node, where a function may refer to hardware or a combination of hardware and software.

The term "active" refers to a function that is providing service, while the term "standby" refers to a function that is not yet providing service. Standby functions may operate in two different modes: hot standby and cold standby. Hot standby refers to a function that is fully functional and acts in synchronism with an active function. A function in hot standby mode is able to take over the role of the active function immediately without need for initialization. Cold standby refers to a function that is not acting in synchronism with an active function. A function in cold standby mode is not able to take over the role of the active function immediately; rather, it needs some form of initialization and/or provisioning before it can do so. Active and standby are dynamic connotations. An active function can become standby, and vice versa. Nevertheless, it is general usage to label functions statically, e.g., based on their physical locations.

There are different types of protection switching systems. In 1+1 protection, one active function is protected by a single standby function. In 1:n protection, n active functions are protected by a single standby function. In m:n protection, n active functions are protected by m standby functions, where m:n protection is a straightforward extension of 1:n protection.

A working function is one that, if present and healthy, will become active at power up, while a protection function is one that will become standby at power up. The distinction between working and protection is not essential in the case of 1+1 protection, although it is common to have a default active function at power up. In the case of 1:n protection, however, interface selectors may be implemented such that the single protection function can be distinguished from the n working functions. In that case, working and protection are static connotations, while active and standby are dynamic connotations. In the baseline configuration, each working function is active and any protection functions are standby. After protection switching occurs, a (e.g., failed) working function will be standby and a protection function will be active.

An interface selector is an entity that is used to select between the signals from the working and protection functions. There are different ways to implement interface selectors. For example, a centralized interface selector is a single switch, where a selection is made between the signals at the input of the selector. A distributed interface selector, on the other hand, refers to multiple switches, where specific combinations of settings result in the selection of the designed input signal.

Figure 2:
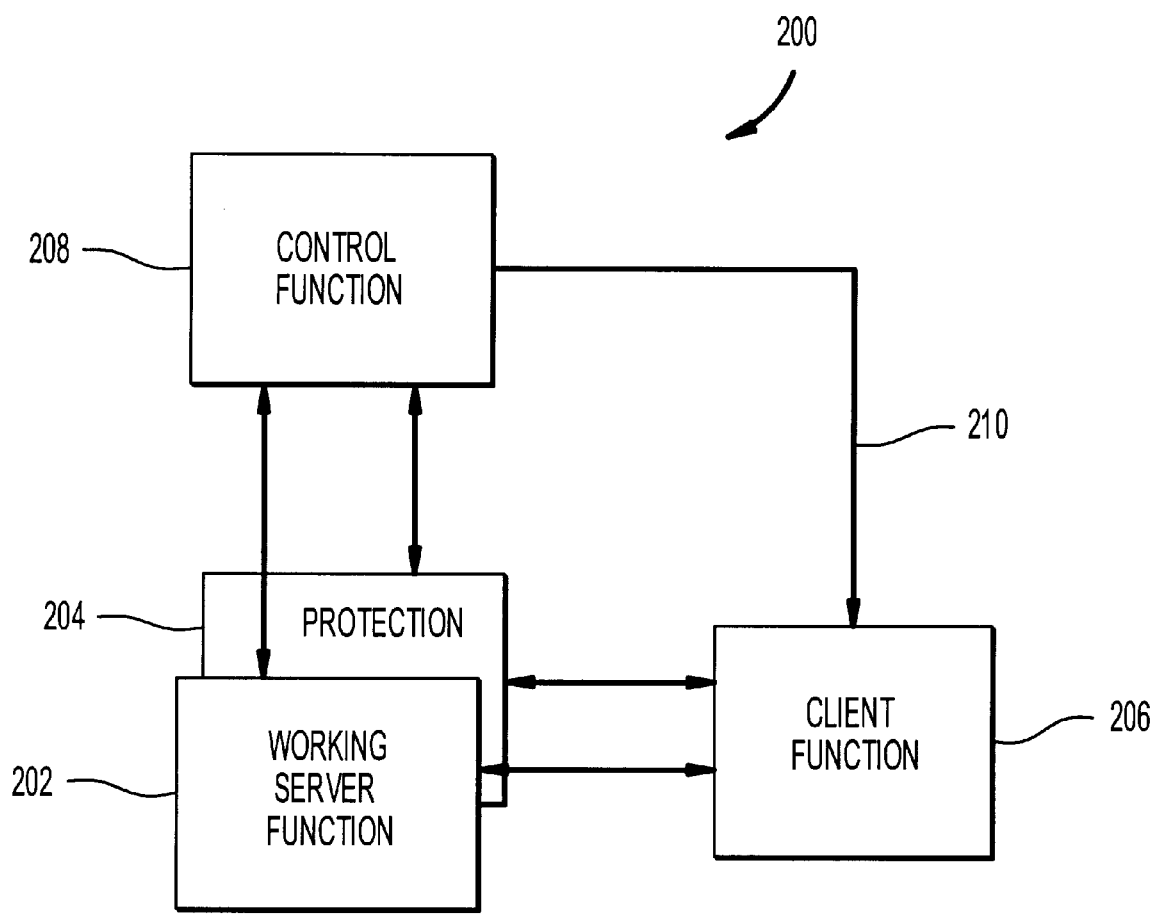
FIG. 2 shows a block diagram of a generic system that provides protection switching in the event of function failure.
Figure 3:
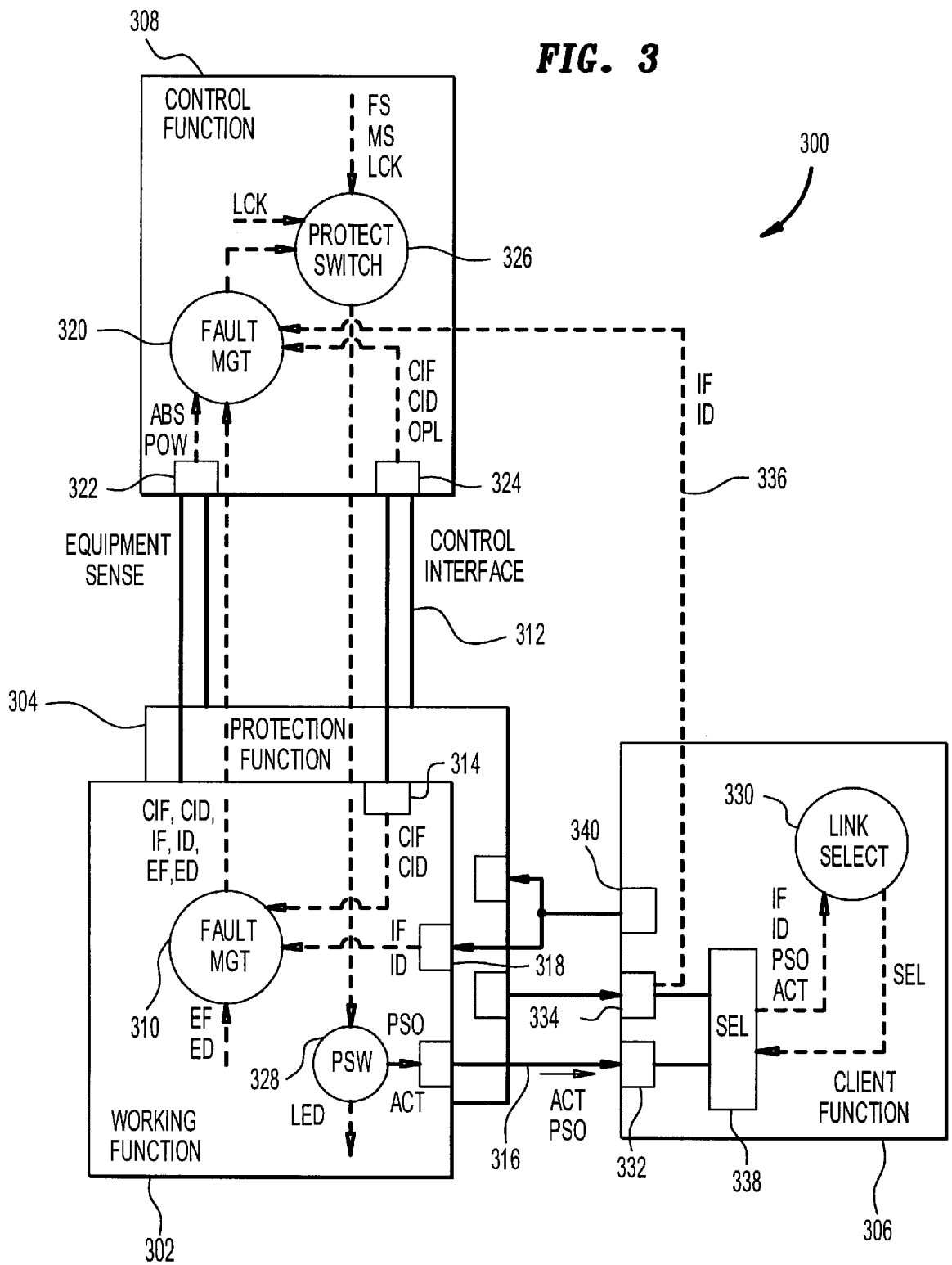
FIG. 3 shows a protection switching system, according to one embodiment of the present invention, in which 1+1 protection is implemented.

FIG. 3 shows protection switching system 300, according to one embodiment of the present invention, in which 1+1 protection is implemented. System 300 comprises working server function 302, protection server function 304, client function 306, and control function 308. As in the case with system 200 of FIG. 2, working server function 302 operates with client function 306, control function 308 monitors working server function 302 for failures, and protection server function 304 provides redundancy in case working server function 302 fails or otherwise becomes degraded. Although only a single client function 306 is represented in FIG. 3, it should be understood that there may be a plurality of such client functions, each of which is capable of operating with either working server function 302 or protection server function 304. Protection switching processing for system 300 is typically implemented as a finite state machine.

In FIG. 3, the solid lines represent actual physical communication links, while the broken lines represent virtual communication links. Actual communication links exist between control function 308 and each server function 302 and 304, and between each server function 302 and 304 and client function 306.

There are many different possible reasons that may lead to a need to perform protection switching from an active server function to a standby server function. Some of these are:

Absence of the active server function.
Opening of the face-plate latches of the active server function.
Power loss on the active server function.
Return of active server function to the boot state (e.g., because of a watchdog timer expiry);
Equipment failure on the active server function (e.g., error detected in an ASIC, FPGA, on-board memory, or in controller complex).
Equipment degradation on the active server function.
Interface failure—error detected on one of the internal interfaces to or from the active server function. The set of possible interface failures depends on the nature of the interface (e.g., transmission, control, timing, power). Examples include loss of signal, loss of clock, loss of frame, and trace identifier mismatch.
Interface degradation (e.g., parity or cyclic redundancy check (CRC) errors detected on the interface).
Externally generated forced switch request.
Externally generated manual switch request.

As used in this specification, the term "failed" refers to a condition where the signal is absent or corrupted to such an extent that the contents of the signal are sufficiently unreliable, while the term "degraded" refers to a condition where there are errors in the signal, but the contents of the signal are still reasonably accurate. An example of a degraded signal may be one in which every tenth frame has a parity error. In that case, a client function may still be able to determine overhead information from the other nine frames.

One difference between a forced protection switch and a manual protection switch is that a forced protection switch will be executed even if the standby server function is degraded, while a manual protection switch will not be executed if the standby server function is degraded. In addition, the following signals are of importance to the protection switching finite state machine:

Lockout: a command to inhibit all automatic protection switching. The lockout condition can be enabled (i.e., set to 1 or true) or disabled (i.e., set to 0 or false) by reception of an externally generated command, but also by an autonomous action within the network element.
Clear: a request to cancel the last active request. A clear request can be considered to be a form of forced switch request.

The disappearance of one of the conditions in the previous list. It may be that the system is required to switch automatically back to the working server function as soon as that function is healthy again, in what is referred to as a revertive operation. Hence, the disappearance of a condition is as much an input that can lead to a protection switch as is its appearance.

Each of control function 308, working server function 302, and protection server function 304 implement parts of fault management (FM) processing and protection switching (PSW) processing, while client function 306 implements link select (LS) processing. FM processing is informed about the various occurrences of faults in the network element (including absence and presence of server functions), correlates the information, and informs the PSW processing about fault conditions. FM processing may need to know whether a protection switch could be performed before it can identify the severity of an alarm (e.g., critical/major/minor). PSW processing, on the one hand, receives correlated fault information from the FM processing and, on the other hand, provides the FM processing with information about the protection status of the server functions. Depending on how the particular functions are implemented, these various types of processing may be implemented in hardware, software, or a combination of hardware and software.

The FM processing correlates fault indications from different sources and passes the necessary information through to the PSW processing. The PSW processing receives switch requests (forced and manual) and lockout commands, on the one hand, and fault information from the FM processing, on the other hand. Based on the inputs it receives and the status of the server functions, the PSW processing decides whether a protection switch should take place. The LS processing is implemented on client functions where interface selectors are located. The LS processing uses fault information about interfaces as well as information received from the servers to decide which of two link interfaces is to be selected: the interface corresponding to the working server function or the interface corresponding to the protection server function. The LS processing is preferably implemented in hardware. The protection switching strategy of the present invention assumes that the active and standby functions act in full synchronism. As such, a more or less autonomous LS processing can be used.

The fault management (FM) processing 310 in each server function 302 and 304 monitors the following characteristics related to its own operations:

CIF: Whether there is a failure at the server side of the control interface 312 between the control function and the server function, as determined at the control interface driver 314 within the server function;

CID: Whether there is degradation at the server side of the control interface 312 between the control function and the server function, as determined at the control interface driver 314 within the server function;

IF: Whether there is a failure at the server side of the interface 316 between the server function and the client function, as determined at the client input driver 318 within the server function;

ID: Whether there is degradation at the server side of the interface 316 between the server function and the client function, as determined at the client input driver 318 within the server function;

EF: Whether there is an equipment failure within the server function; and

ED: Whether there is equipment degradation within the server function.

The server's FM processing 310 repeatedly communicates the status of each of these characteristics to the FM processing 320 in control function 308 via control interface 312.

In addition to receiving the status of characteristics from each server function, the FM processing 320 within control function 308 also monitors the following additional characteristics related to the operations of each server function:

ABS: Whether the server function is absent or present, as determined at the equipment sense driver 322 within the control function;

POW: Whether there is a power failure in the server function, as determined at the equipment sense driver 322 within the control function;

CIF: Whether there is a failure at the server side of the control interface 312 between the control function and the server function, as determined at the control interface driver 324 within the control function;

CID: Whether there is degradation at the server side of the control interface 312 between the control function and the server function, as determined at the control interface driver 324 within the control function; and OPL: Whether there is an open latch (e.g., the face plate latch) between the control function and the server function, as determined at the control interface driver 324 within the control function.

The ABS characteristic may be passed to the FM processing by slot management (SM) processing (not shown in FIG. 3), which is implemented within control function 308. SM processing is informed about absence and presence of each server function, and is responsible for initiating download and hence knows part of the sanity status of the server function. The controller's FM processing 320 processes all of these characteristics and provides input to the protection switching processing 326 within control function 308.

In addition to receiving input from the controller's FM processing 320, the controller's protection switching (PSW) processing 326 receives the following additional commands for each server function:

FS: Whether a forced switch is to be performed;

MS: Whether a manual switch is to be performed; and

LCK: Whether lockout is enabled.

If the controller's PSW processing 326 determines that protection switching needs to be performed, protection switching instructions will be sent to the PSW processing 328 within each server function via the control interface 312.

When a server's PSW processing 328 receives protection switching instructions from the controller's PSW processing 326, the server function passes the following information to client function 306:

PSO: Whether protection switch override is enabled; and

ACT: Whether the server function is active.

Protection switch override (PSO) is enabled when either (1) a forced switch is to be implemented or (2) the lockout condition is enabled. In this embodiment, this information is conveyed using in-band signaling, in which PSO and ACT bits are part of overhead data that are repeatedly transmitted from each server function to client function 306. This in-band signaling is represented in FIG. 3 by the bold arrow pointing from the working and protection server functions to client function 306. When the server functions are implemented as circuit boards, each server's PSW processing 328 turns on and off one or more LEDs on its circuit board that indicate whether the circuit board is active or standby.

The link select (LS) processing 330 within client function 306 monitors the PSO and ACT information in the overhead data from each server function. The LS processing 330 also monitors the following additional characteristics related to the operations of each server function:

IF: Whether there is a failure at the server side of the interface 316 between the server function and the client function, as determined at the server input driver (332 or 334) within the client function; and ID: Whether there is degradation at the server side of the interface 316 between the server function and the client function, as determined at the server input driver (332 or 334) within the client function.

The interface failure (IF) and interface degradation (ID) characteristics of the server side of the interface 316 between the server functions and the client function, as determined within the client function, are transmitted to the FM processing 320 of the control function 308 via an interface shown as virtual communication link 336 in FIG. 3. The LS processing 330 determines whether protection switching is to be performed and, if so, instructs the interface selector 338 to switch from the input driver 332 for the working server function 302 to the input driver 334 for the protection server function 304. Note that, in this embodiment, client function 306 has only one output driver 340 that is connected to both servers' input driver 318. This enables the protection server function to receive the same data as the working server function so that the protection server function can operate in a hot standby mode. In alternative embodiments, a client function may have a separate output driver for each server function.

Possible Scenarios

The following are some of the various protection switching scenarios that can occur.

A. Fault Detected by the Controller

1. The controller's PSW processing determines that the active function has degraded or failed, where degradation and failure to two types of function faults.

2. The controller's PSW processing determines whether a switch can be executed (e.g., whether lockout is disabled and whether the standby function is healthy enough).

3. If the protection switch can be executed, the controller's PSW processing informs the PSW processing in the active server function that it is to become standby and that it should switch off its active-indication LED. The controller's PSW processing on the control function also informs the PSW processing in the standby server function that it is to become active and that it should switch on its active-indication LED.

4. Each server's PSW processing asserts its new status information in its in-band signal to the client function. Under normal operating conditions in which lockout is disabled, each server's PSW processing will disable the protection switch override indicator PSO.

5. On each client function, the active/standby and the PSO conditions are reported to the LS processing. When the LS processing observes that the formerly standby server function becomes active, it will instruct the interface selector to switch to the corresponding interface.

B. Externally Generated Switch Request Received

1. The controller's PSW processing receives either a force switch request or a manual switch request.

2. The controller's PSW processing determines whether this switch request can be executed (e.g., whether the standby function is healthy enough).

3. If the protection switch can be executed, the controller's PSW processing informs the PSW processing in the active server function that it is to become standby and that it should switch off its active-indication LED. The controller's PSW processing on the control function also informs the PSW processing in the standby server function that it is to become active and that it should switch on its active-indication LED.

4. Each server's PSW processing asserts its new status information in its in-band signal to the client function. In case of a forced switch request, in addition to setting the active/standby indicator ACT, each server's PSW processing will enable the protection switch override indicator PSO. In case of a manual switch request, the PSO indicator is disabled by each server.

5. On each client function, the active/standby and the PSO conditions are reported to the LS processing. When the LS processing observes that the formerly standby server function becomes active, if appropriate, it will instruct the interface selector to switch to the corresponding interface.

C. Fault Detected by a Client

1. The LS processing in one of the client functions is informed about a fault on its active server-client interface and, as a result, automatically switches to the standby interface, if the standby interface is healthy enough and the override condition is disabled.

2. The controller's FM processing receives an indication of the interface failure from the client, correlates that information, and informs the controller's PSW processing.

3. The controller's PSW processing decides whether a protection switch should be executed. This should be true; otherwise, the PSW processing should have made sure that an enabled override condition was asserted on the interface.

4. The controller's PSW processing and each server's PSW processing execute the protection switch, as in Steps 3 and 4 of Scenario A, respectively.

5. All other client functions will switch to the previously standby interface, as in Step 5 of Scenario A.

D. Active Server Function Removed

1. When the active server function is removed (e.g., abruptly taken off line), each client function detects a loss of signal on its active interface and will automatically switch over to the standby interface.

2. The controller's FM processing receives an indication of the absence of the active server function, correlates that information, and informs the controller's PSW processing.

3. The controller's PSW processing and each server's PSW processing execute a protection switch, as in Steps 3 and 4 of Scenario A, respectively.

4. Each client function will receive indication of the new active server function, confirming the previous switch to the previously standby interface.

E. Revertive Operation

If the controller's PSW processing is provisioned to support revertive protection switching, it will perform a protection switch back to the working server function, when the fault condition is cleared or when a working server function that was absent is present, downloaded, and provisioned. The scenario is basically identical to Scenario A. One important thing to note is that revertive switching is initiated by the controller's PSW processing. The behavior of the LS processing is completely determined by the state of the two interfaces and the ACT and PSO indicators embedded in the in-band signal.

In the case of the 1+1 protection of FIG. 3, the interface selector on each client function selects between two interfaces. Each interface carries two indicators: a status indicator ACT denoting active or standby and an override indicator PSO indicating whether protection switch override is enabled or disabled.

The PSW processing will set the status indicator of one interface to active and the status indicator of the other interface to standby. During protection switching transitions, both interfaces may temporarily carry standby statuses or both interfaces may carry active statuses. The discussion below describes how the LS processing in each client function should behave under those and other circumstances.

The PSW processing will also set the override indicator on both interfaces to the same value. However, because the PSW processing in the control function may not be able to update a server function because of failures in the control path, the LS processing will only look at the override indicator on the interface that has the status indicator set to active. If both interfaces indicate active status, the LS processing will use the override value on the interface that turned to active most recently. If both interfaces are failed or degraded or indicate standby status, then LS processing will retain its previous interface selection for determination of the override value.

When a client function is initially powered up, the LS processing will set the interface selector as follows:

No signal on either interface: Undetermined.

One interface carries a signal: Select interface carrying signal, ignore status and override indicators.

Both interfaces carry a signal: Select interface that has the status indicator set to active.

Once both interfaces carry a signal and the interface selector is set to one of the two interfaces, the following events may trigger the selector to switch:

The status indicator (ACT) of one of the two interfaces changes;

The override indicator (PSO) on the selected interface changes;

A signal fail condition (IF) is detected by the client function; or

A signal degradation condition (ID) is detected by the client function.

The LS processing within each client function assigns one of five possible states for each server function based on the values of ACT, IF, and ID for that server function, where ACT=1 means the server function is active, IF=1 means there is an interface failure, and ID=1 means there is interface degradation. Table I identifies the five states for the various combinations of ACT, IF, and ID values. Whether a server is active or standby is determined by the client based on the status indicator ACT received from the server via in-band signaling. Whether a server is healthy, degraded, or failed is determined by the client locally from the IF and ID conditions. If a server is failed, then the status indicator ACT will not be available (N/A) to the client. In addition, whether the ID value is set or not in the case of a failed server depends on the implementation, but either way the value is irrelevant.

TABLE I

SERVER FUNCTION STATES

| ACT | IF | ID  | STATE            |
|-----|----|-----|------------------|
| 0   | 0  | 0   | Standby          |
| 0   | 0  | 1   | Degraded Standby |
| N/A | 1  | 0/1 | Failed           |
| 1   | 0  | 0   | Active           |
| 1   | 0  | 1   | Degraded Active  |

Depending on the timing and sequence of operations within the control function and the working and protection server functions, it may be possible, at one time or another, for the LS processing in the client function to assign any combination of states listed in Table I to the two server functions. Table II presents the rules applied by the LS processing to handle each possible combination of states for two servers A and B, independent of whether server A or server B was most recently the active server function. In Table II, responses indicated with an asterisk (*) are independent of the value of the protection switch override condition PSO.

combinations of Rules 4 and 5, respectively, also apply after the completion of an automatic protection switch in the event of degradation or failure of the previously selected working server. In these situations, it is also appropriate to select the active server, as dictated by Rules 4 and 5.

Rule 1

If the state of the protection server changes from Standby to Active, while the state of the working server is still Active, the (Active, Active) combination of Rule 1 applies. This combination of states can occur as a transient situation during a forced or manual protection switch implemented by the controller, when the protection server switches from Standby to Active before the working server switches from Active to Standby, as in Scenario B described earlier. In that case, the immediate switch to the protection server by the client (i.e., while both servers are Active and without waiting for the state of the working server to change to Standby) is an appropriate response, as specified in Rule 1. Depending on the implementation, if an (Active, Active) combination exists for more than a specified time, an alarm may be raised and the client may be configured to return to its power-up default active selection.

Rule 6

Similarly, if the state of the working server changes from Active to Standby, while the state of the protection server is

TABLE II

PROTECTION SWITCHING RULES

| RULE | SERVER A         | SERVER B         | RESPONSE                                                                         |
|------|------------------|------------------|----------------------------------------------------------------------------------|
| 1    | Active           | Active           | Select server that changed to Active most recently*                              |
| 2    | Active           | Standby          | Select Active server*                                                            |
| 3    | Active           | Degraded Active  | Select Active server*                                                            |
| 4    | Active           | Degraded Standby | Select Active server*                                                            |
| 5    | Active           | Failed           | Select Active server*                                                            |
| 6    | Standby          | Standby          | Retain previous selection*                                                       |
| 7    | Standby          | Degraded Active  | If override disabled, then select Standby server, else select Degraded Active server |
| 8    | Standby          | Degraded Standby | If override disabled, then select Standby server, else retain previous selection |
| 9    | Standby          | Failed           | If override disabled, then select Standby server, else retain previous selection |
| 10   | Degraded Active  | Degraded Active  | Select server that changed state most recently*                                  |
| 11   | Degraded Active  | Degraded Standby | Select Degraded Active server*                                                   |
| 12   | Degraded Active  | Failed           | Select Degraded Active server*                                                   |
| 13   | Degraded Standby | Degraded Standby | Retain previous selection                                                        |
| 14   | Degraded Standby | Failed           | If override disabled, then select Degraded Standby server, else retain previous selection |
| 15   | Failed           | Failed           | No protection available                                                          |

Rule 2

Under normal operating conditions, the state of the working server is Active, the state of the protection server is Standby, and the client selects the working server, as indicated by Rule 2 in Table II. A forced or manual protection switch may involve switching between a healthy working server and a healthy protection server. In that case, after the forced or manual protection switch is completed, the state of the working server will be Standby and the state of the protection server will be Active. In this case, it is appropriate for the client to select the protection server and Rule 2 applies once again.

Rules 4 and 5

If the client determines that a non-selected protection server has degraded or failed (i.e., the state of the protection server changes from Standby to either Degraded Standby or Failed), there is no reason to take any protection switching action, because the selected server is the healthy working server. These situations correspond to Rules 4 and 5, respectively. The (Active, Degraded Standby) and (Active, Failed)

still Standby, the (Standby, Standby) combination of Rule 6 applies. As with the (Active, Active) combination, the (Standby, Standby) combination can occur as a transient situation during a forced or manual protection switch implemented by the controller, when the working server switches from Active to Standby before the protection server switches from Standby to Active, as in Scenario B described earlier. In the case of the (Standby, Standby) combination, however, the appropriate response is to retain the previous selection (i.e., no protection switch). The rationale for Rule 6 is that it is not prudent to switch to a standby function if that function is not ready yet. Depending on the implementation, if a (Standby, Standby) combination exists for more than a specified time, an alarm may be raised and the client may be configured to return to its power-up default active selection.

Rules 7 and 9

If the client determines that a selected working server has degraded or failed (i.e., the state of the working server changes from Active to either Degraded Active or Failed), an automatic switch to a healthy protection server (i.e., in Standby state) is an appropriate response, if automatic switching is enabled (i.e., override indicator PSO is disabled). If automatic switching is disabled (i.e., override is enabled), then no automatic switch is made. Rules 7 and 9 apply to these degraded and failed situations, respectively.

Another situation in which the (Standby, Degraded Active) combination of Rule 7 can exist is during a forced switch to a degraded, but not yet failed server. Although a manual switch of this type is not allowed, a forced switch is allowed. Thus, Rule 7 states that, when a (Standby, Degraded Active) combination is present, if override is disabled (as during a manual switch), then the manual switch to the degraded server is not implemented and the previously selected server in the Standby state is retained. However, if override is enabled (as during a forced switch), then the forced switch to the degraded server is implemented and the server in the Degraded Active state is newly selected. As indicated by Rule 9, neither a manual nor a forced switch to a failed server is possible, since a failed signal cannot convey to a client that the corresponding server function thinks it is active, since the client cannot read the ACT bit from that server.

Rule 3

The (Active, Degraded Active) combination of Rule 3 can arise as a transient combination during a switch from a degraded server to a healthy server, where the degraded server was previously a healthy active server. One possible scenario (see Scenario C described earlier) begins with the normal operating conditions in which both the working and protection servers are healthy, the working server is active, and the protection server is standby. In this case, as dictated by Rule 2, the client selects the active working server. The client then determines that the working server becomes degraded. In that case, the state of the working server becomes Degraded Active and the (Standby, Degraded Active) combination of Rule 7 applies. If override is disabled, then the client will automatically switch to the healthy protection server; otherwise, override is enabled and the client will retain the selection of the now degraded working server.

The controller will eventually receive information (i.e., ID) from the client about the degradation of the working server and, if lockout is disabled, the controller will initiate an automatic protection switch to the healthy protection server for all clients. During that protection switch, the transient (Active, Degraded Active) combination of Rule 3 may occur (i.e., after the state of the protection server changes from Standby to Active, but before the state of the working server changes from Degraded Active to Degraded Standby), in which case the selection of the healthy protection server is appropriate, as indicated by Rule 3. Eventually the transient (Active, Degraded Active) combination will change to the (Active, Degraded Standby) combination of Rule 4 and the healthy protection server will be selected.

If, however, lockout is enabled, then protection switching is inhibited and, when the controller receives the ID information from the client about the degradation of the working server, the controller will not initiate a protection switch, in which case, the (Standby, Degraded Active) combination of Rule 7 will be maintained, override will remain enabled, and the client will retain the selection of the degraded active working server, as dictated by Rule 7.

Another situation in which the (Active, Degraded Active) combination of Rule 3 can occur is if, during a forced or manual switch (e.g., from a healthy working server to a healthy protection server), one of the servers becomes degraded. According to this scenario, one of the servers happens to become degraded at the exact instance that the transient (Active, Active) combination would otherwise have occurred. One the one hand, the likelihood of such an occurrence is extremely low. On the other hand, if such a combination were to occur, Rule 3 would apply, as follows.

If the working server was the server that suddenly became degraded, then, according to Rule 3, the healthy protection server would be selected during the transient situation. After the transient (Active, Degraded Active) combination is soon replaced by the (Active, Degraded Standby) combination of Rule 4, the client would retain selection of the healthy protection server.

If, however, the protection server was the server that suddenly became degraded, then, according to Rule 3, the healthy working server would be retained during the transient situation. In that case, the transient (Active, Degraded Active) combination of Rule 3 will soon be replaced by the (Standby, Degraded Active) combination of Rule 7, which would result in either (1) the retention of the healthy working server (for a manual switch in which override is disabled) or (2) a switch to the degraded protection server (for a forced switch in which override is enabled).

Rule 8

Analogous to Rule 3, the (Standby, Degraded Standby) combination of Rule 8 can arise as a transient combination during a switch from a degraded server to a healthy server, where the degraded server was previously a healthy active server. One possible scenario (see Scenario C described earlier) begins with the normal operating conditions in which both the working and protection servers are healthy, the working server is active, and the protection server is standby. In this case, as dictated by Rule 2, the client selects the active working server. The client then determines that the working server becomes degraded. In that case, the state of the working server becomes Degraded Active and the (Standby, Degraded Active) combination of Rule 7 applies. If override is disabled, then the client will automatically switch to the healthy protection server; otherwise, override is enabled and the client will retain the selection of the now degraded working server.

The controller will eventually receive information (i.e., ID) from the client about the degradation of the working server and, if lockout is disabled, the controller will initiate an automatic protection switch to the healthy protection server for all clients. During that protection switch, the transient (Standby, Degraded Standby) combination of Rule 8 may occur (i.e., after the state of the working server changes from Degraded Active to Degraded Standby, but before the state of the protection server changes from Standby to Active), in which case, as indicated by Rule 8, if override is disabled, the client will retain its recent selection of the healthy protection server, and, if override is enabled, the client will retain its original selection of the degraded working server. Eventually the transient (Standby, Degraded Standby),combination will change to the (Active, Degraded Standby) combination of Rule 4 and the healthy protection server will be selected.

If, however, lockout is enabled, then protection switching is inhibited and, when the controller receives the ID information from the client about the degradation of the working server, the controller will not initiate a protection switch, in which case, the (Standby, Degraded Active) combination of Rule 7 will be maintained, override will remain enabled, and the client will retain the selection of the degraded active working server, as dictated by Rule 7.

Another situation in which the (Standby, Degraded Standby) combination of Rule 8 can occur is if, during a forced or manual switch (e.g., from a healthy working server to a healthy protection server), one of the servers becomes degraded. According to this scenario, one of the servers happens to become degraded at the exact instance that the transient (Standby, Standby) combination would otherwise have occurred. One the one hand, the likelihood of such an occurrence is extremely low. On the other hand, if such a combination were to occur, Rule 8 would apply, as follows.

If the working server was the server that suddenly became degraded, then, according to Rule 8, for a manual switch in which override is disabled, the healthy protection server would be selected during the transient situation, and, for a forced switch in which override is enabled, the degraded working server would be retained. After the transient (Standby, Degraded Standby) combination is soon replaced by the (Active, Degraded Standby) combination of Rule 4, the client would select the healthy protection server, where the switch was a manual switch or a forced switch.

If, however, the protection server was the server that suddenly became degraded, then, according to Rule 8, whether the switch was a manual switch or a forced switch, the healthy working server would be retained during the transient situation. In that case, the transient (Standby, Degraded Standby) combination of Rule 8 will soon be replaced by the (Standby, Degraded Active) combination of Rule 7, which would result in either (1) the retention of the healthy working server (for a manual switch in which override is disabled) or (2) a switch to the degraded protection server (for a forced switch in which override is enabled).

Rules 10–15

Rules 10–15 cover situations in which each of the working and protection servers are either degraded or failed. The responses in these situations are similar to analogous situations in which one or both servers are healthy. For example, the response to the (Degraded Active, Degraded Active) combination of Rule 10 is similar to the response to the (Active, Active) combination of Rule 1. Similarly, Rule 11 is analogous to Rule 2, Rule 12 is analogous to Rule 5, Rule 13 is analogous to Rule 6, and Rule 14 is analogous to Rule 9. Of course, there is no protection switching available if both the working and protection servers have failed, as in the (Failed, Failed) combination of Rule 15.

Alternative Systems

FIG. 3 shows a 1+1 switch protection system in which each function is implemented on a different single circuit board. The present invention can also be implemented for other systems. In some of these alternative systems, a function may be implemented on two or more different circuit boards.

Figure 4:
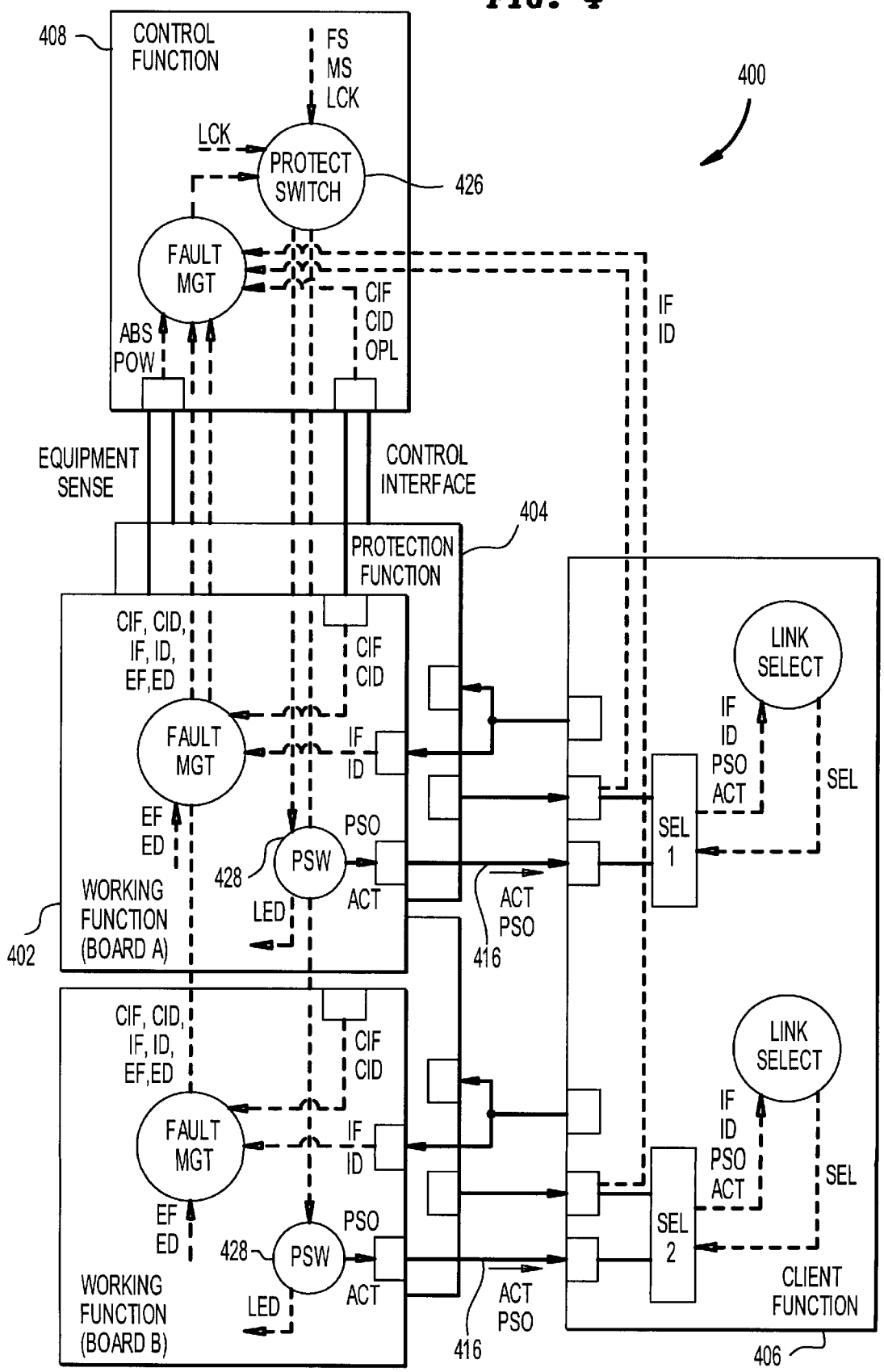
FIG. 4 shows a protection switching system, according to one embodiment of the present invention, in which each server function is implemented on two circuit boards.

FIG. 4 shows protection switching system 400, according to one embodiment of the present invention, in which each server function is implemented on two circuit boards A and B. As in the system 300 of FIG. 3, in system 400, the PSW processing 426 in the control function 408 receives and uses switch and lockout requests and fault information to decide whether or not to implement protection switching. If a protection switch is to be performed, the controller's PSW processing 426 instructs the PSW processing 428 in each circuit board of the working and protection server functions 402 and 404 accordingly. These in turn assert their statuses on the server-client interfaces 416. Interface selections are then made on each client function 406.

FIG. 4 shows two selectors (SEL1 and SEL2) for each client function 406 implemented on a single circuit board. It is also possible that each client function is implemented on two or more boards with selectors on different circuit boards or more than two selectors on a single circuit board. The link select processing in the client function, the fault management processing in the control and server functions, and the protection switching processing in the server function of system 400 are identical to the corresponding processing in system 300 of FIG. 3. The operations of the PSW processing in the control function are somewhat different in system 400. In deciding whether a switch can be performed, the controller's PSW processing takes into consideration the status of all circuit boards involved. For example, when a fault is detected in Board A of the active server function, but Board B of the standby server function is not present, a switch should not be performed.

Figure 5:
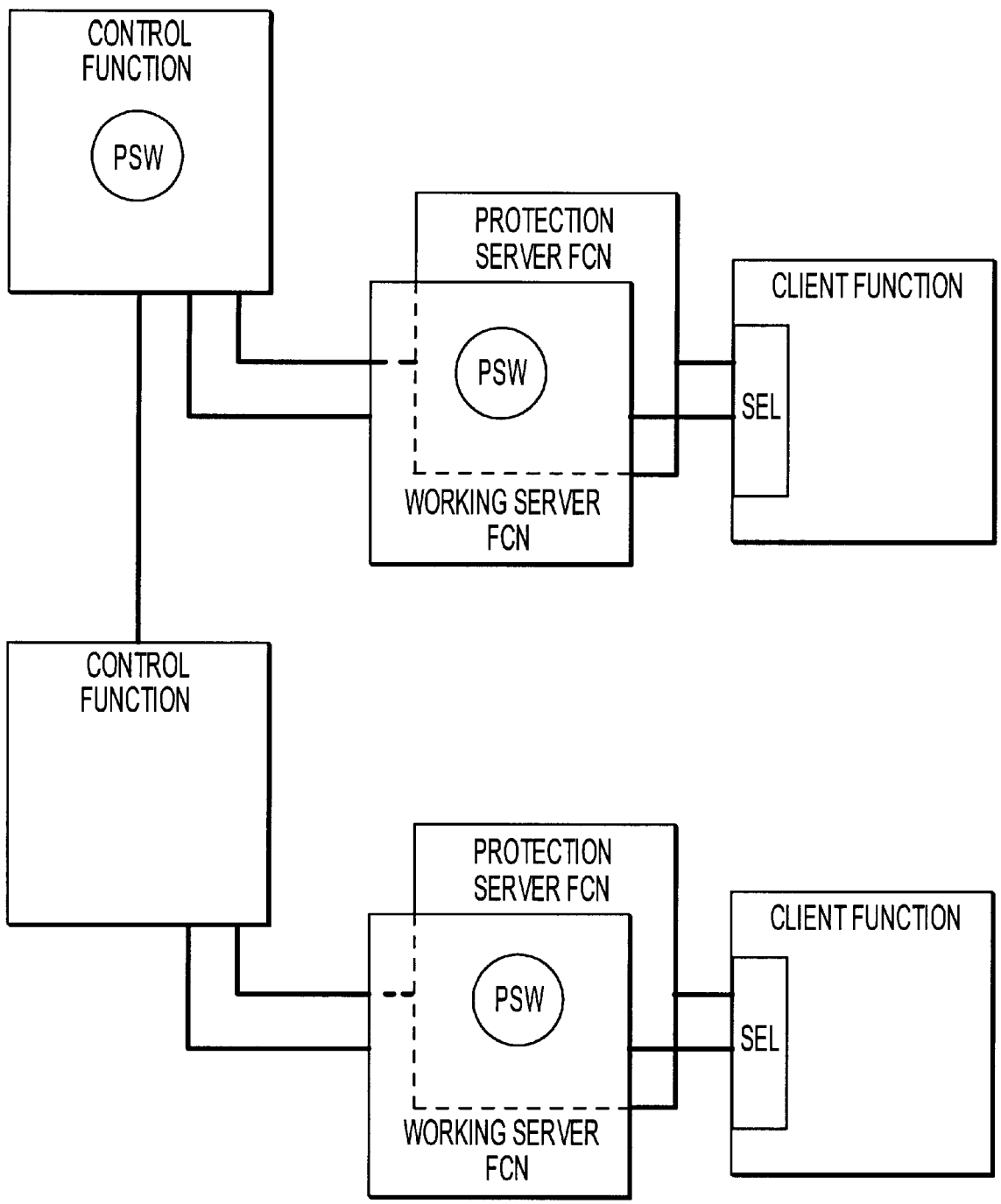
FIG. 5 shows a protection switching system, according to one embodiment of the present invention, in which duplicated circuit boards form two protection planes.

FIG. 5 shows protection switching system 500, according to one embodiment of the present invention, in which duplicated circuit boards form two protection planes. In system 500, the two working server functions are connected and the two protection server functions are connected, but there are no connections between a working server function and a protection server function. A protection switch of one server function therefore needs to occur at the same time as a protection switch of the other.

Moreover, in system 500, each working/protection server function pair is controlled by a different control function (e.g., when the two server function pairs are implemented on different shelves). PSW processing in one of the control functions is responsible for the duplicated protection planes. This PSW processing will be informed about switch commands (forced and manual), lockout commands, and fault information. Based on that, it will decide whether to perform protection switching actions. When a protection switch is performed, the PSW processing in that control function communicates with the PSW processing in the various server functions that are responsible for lighting the appropriate LEDs and asserting their statuses on the interfaces with the various client functions. In general, the various software components do not need to know on which processor other components are located. In this case, all components will be able to interface with the controller's PSW processing, independently of the control function on which it is located.

Figure 6:
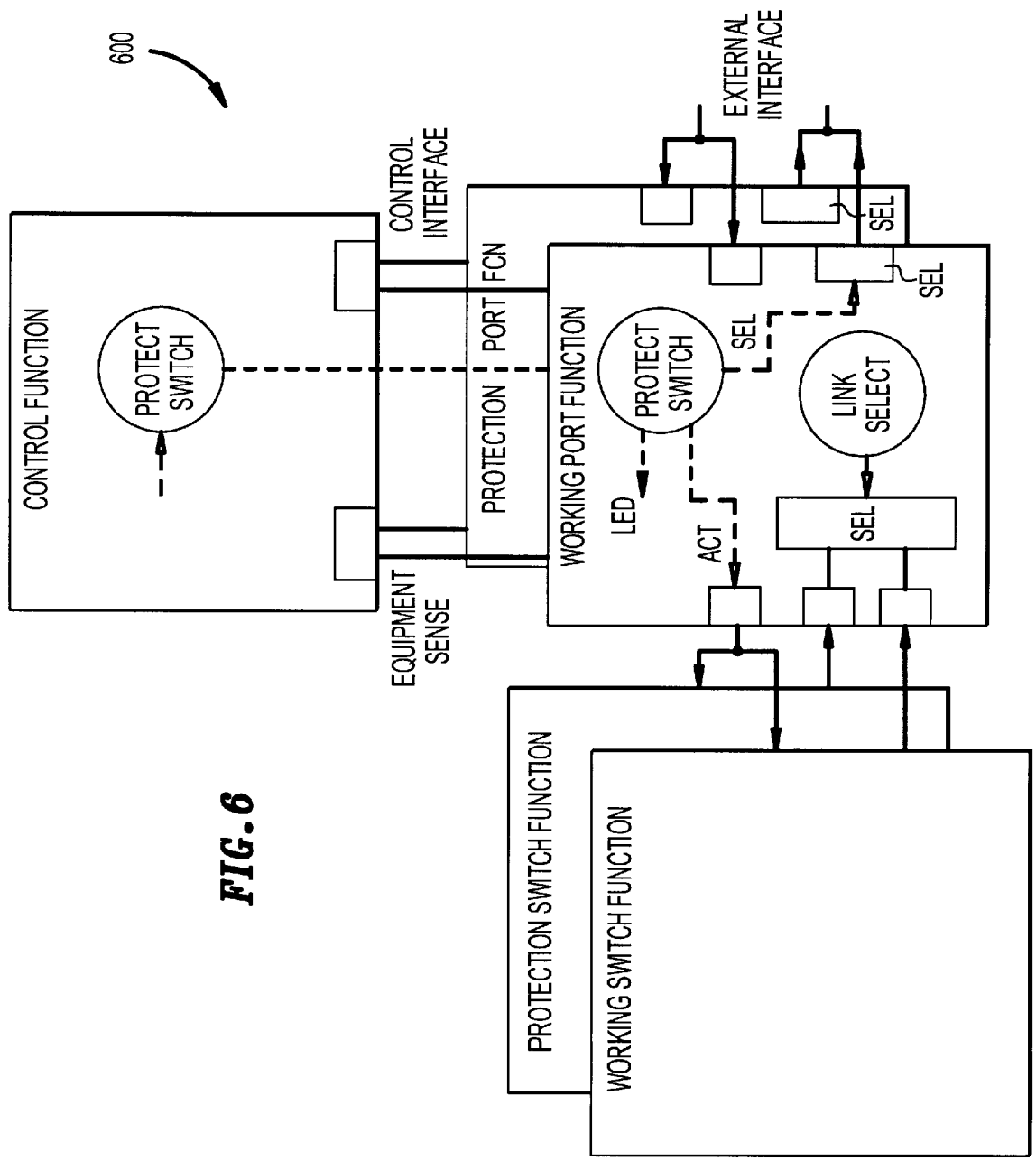
FIG. 6 shows a protection switching system, according to one embodiment of the present invention, in which 1+1 protection is implemented using distributed connectors.

FIG. 6 shows protection switching system 600, according to one embodiment of the present invention, in which 1+1 protection is implemented using distributed connectors. System 600 relates to a telecommunications application in which protection switching is implemented for the port functions. In this case, a switch function (SF) (i.e., the client function) is connected to a switch-protected port function (PF) (i.e., the server function), where independent switch protection may also be provided for the switch function. In system 600, working and protection port functions are connected to the same external interface and the outgoing signal needs to be switched between the two circuit boards. The PSW processing on the working and protection port functions are responsible for setting the selectors on the outgoing signals. In general, it is necessary to make sure that both cards are not transmitting at the same time. This can be achieved with proper sequencing by the controller's PSW processing. The interface between the working port function and the switch functions is the same as the corresponding interface in system 300 of FIG. 3. As such, the PSW processing on each port function is responsible for:

setting the interface selector for the external interface;
asserting its active/standby status on the interface with the switch function; and
lighting the LEDs.

The interface selector on each port function is responsible for selection of the incoming signals from the switch functions. This functionality is part of the PSW processing of the port functions and has nothing to do with any protection switching of the switch functions. In another example of distributed connectors, the circuit boards are connected to a bus, where the switch is on the circuit boards themselves.

The discussion of system 300 of FIG. 3 assumes that the protection server function operates in a warm standby mode. The situation of cold standby is different in the sense that the standby server function first needs to be initialized and/or provisioned before it can take over service. This has some implications for the interaction between the PSW processing in the control function and the components that are responsible for initialization and provisioning. Otherwise, the case of cold standby is identical to the case of hot standby.

Figure 7:
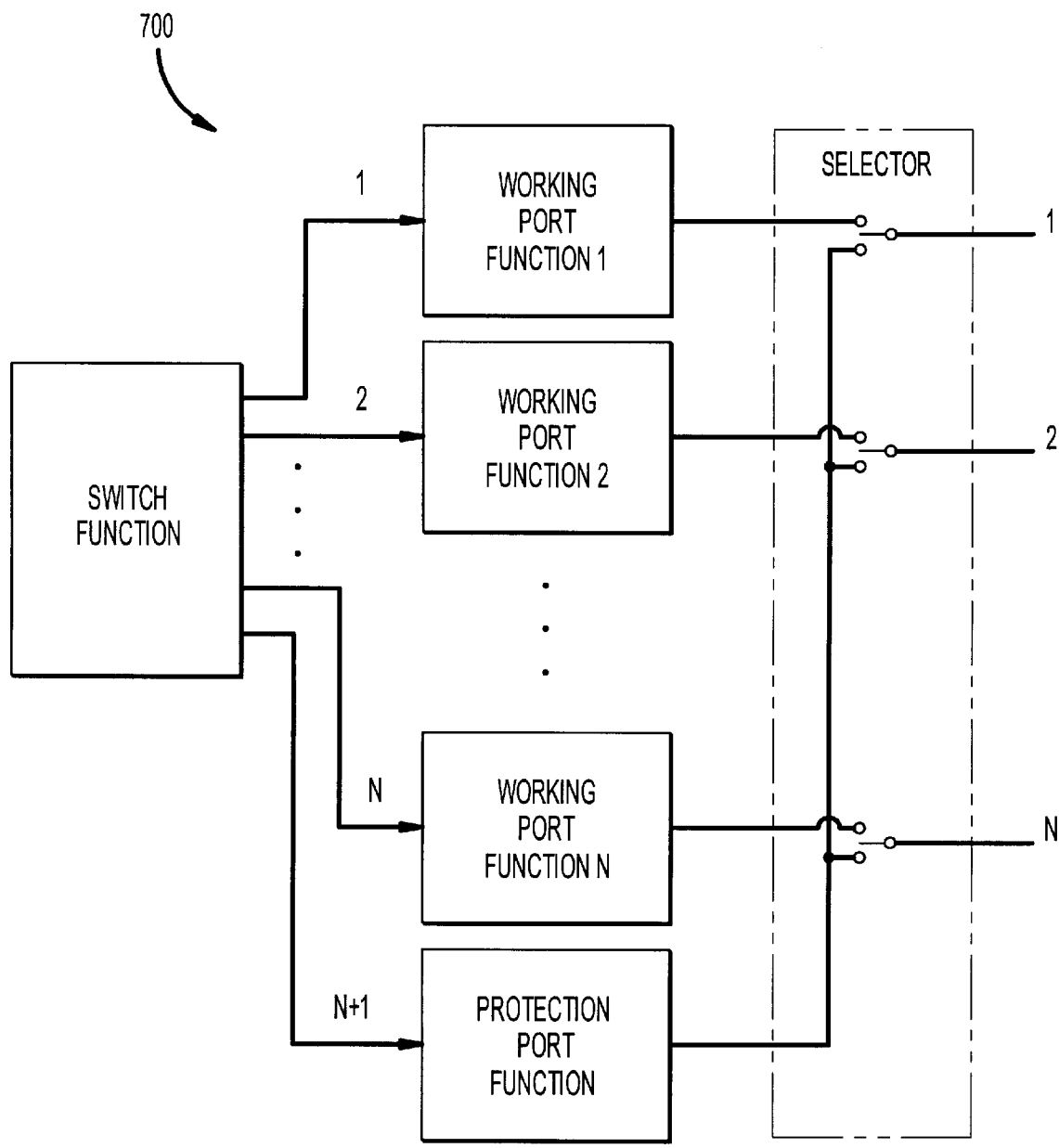
FIG. 7 shows a protection switching system, according to one embodiment of the present invention, in which 1+n protection is implemented.

FIG. 7 shows protection switching system 700, according to one embodiment of the present invention, in which 1+n protection is implemented. Like system 600 in FIG. 6, system 700 relates to a telecommunications application in which one or more switch functions (SF) are connected to switch-protected port functions (PF), but in system 700 n working port functions are protected by a single protection port function. As in system 600, in system 700, there are two types of selectors involved: one at the switch function side, where connections can be made to n of the n+1 port circuit boards, and another at the side of the external interfaces, where each of the n external interface links can be connected to either a working port function or to the protection port function. At the switch function side, there is no difference between the connections to the working port functions, on the one hand, and to the protection port function, on the other hand. At the external interface side, however, there is a clear difference between the way the working port functions and the protection port function are connected. The switch functions are intelligent circuit boards, while the selectors at the external interface side may be implemented on a dumb relay circuit board. In the 1+n protection scheme, the ACT and PSO indicators are sent to the switch function (SF), which then uses these inputs as the means to determine its configuration.

Figure 8:
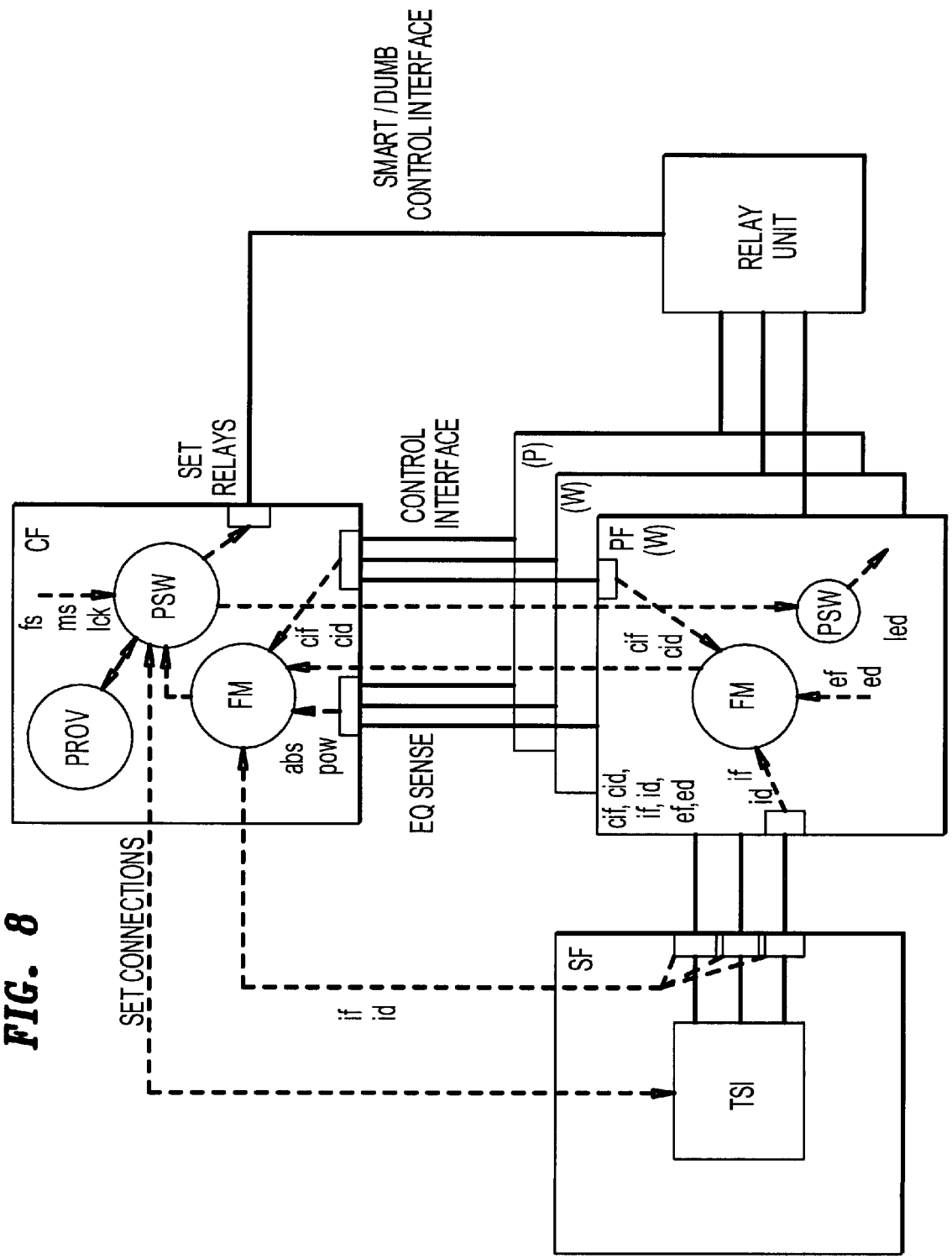
FIG. 8 shows the protection switching mechanism for the system of FIG. 7, according to one embodiment of the present invention.

FIG. 8 shows the protection switching mechanism for system 700 of FIG. 7, according to one embodiment of the present invention. The following scenario describes how a protection switch takes place, assuming that all working port functions were active and the protection port function was standby:

(1) A switch request is received by the PSW processing in the control function or a fault indication is sent to the controller's PSW processing by the FM processing.

(2) The controller's PSW processing checks whether a protection switch can be performed.

(3) If it decides that a protection switch should be performed, the controller's PSW processing informs provisioning processing (PROV) within the control function (i.e., the component or components that are responsible for provisioning functions) that the protection port function needs to be provisioned according to the working port function whose operations it will take over.

(4) When this is done, the controller's PSW processing sets the bridges and switches in the relay unit and on the switch function.

(5) The controller's PSW processing indicates to the PSW processing in the appropriate working port function that it is to become standby and to the PSW processing in the protection port function that it is to become active.

(6) Each port's PSW processing is responsible for handling its own interface selectors in a manner similar to the 1+1 protection scheme of FIG. 3.

Those skilled in the art will understand that FIGS. 3–8 show only an exemplary set of the different systems that can be implemented using the present invention. For example, although the present invention has been described in the context of systems that support three different levels of health for a server (healthy, degraded, and failed), those skilled in the art will understand that versions of the present invention can also be implemented for systems that support only two different levels of server health (i.e., healthy and failed).

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A protection switching system, comprising:
   (a) a client function;
   (b) a working server function, configured to communicate with the client function;
   (c) a protection server function, configured to communicate with the client function; and
   (d) a control function, configured to monitor the health of the working and protection server functions for failures and to implement protection switching from the working server function to the protection server function, wherein:
      each of the working and protection server functions is configured to transmit to the client function (1) a status condition indicating whether the server function is active or standby and (2) an override condition; and
      the client function is configured to monitor the health of the working and protection server functions and to implement protection switching from the working server function to the protection server function based on the health, the status condition, and the override condition for each of the working and protection server functions.

2. The invention of claim 1, wherein:
   the override condition is enabled if automatic protection switching by the client function is to be disabled; and
   the override condition is disabled if automatic protection switching by the client function is to be enabled.

3. The invention of claim 2, wherein:
   the override condition is enabled if a forced switch is to be implemented by the control function; and
   the override condition is disabled if a manual switch is to be implemented by the control function.

4. The invention of claim 1, wherein:
   the override condition is enabled if a forced switch is to be implemented by the control function; and
   the override condition is disabled if a manual switch is to be implemented by the control function.

5. The invention of claim 1, wherein the control function is configured to receive a lockout command to disable all automatic protection switching, wherein, if lockout is enabled, the override condition is set to disable automatic protection switching by the client function.

6. The invention of claim 1, wherein the client function determines whether each server function is healthy, degraded, or failed and the client function determines whether to select the working server function or the protection server function based on the health, the status condition, and the override condition of each server function.

7. The invention of claim 6, wherein a state is determined for each server function wherein:
   the state is standby when ACT=0, IF=0, and ID=0;
   the state is degraded standby when ACT=0, IF=0, and ID=1;
   the state is failed when IF=1;
   the state is active when ACT=1, IF=0, and ID=0; and
   the state is degraded active when ACT=1, IF=0, and ID=1, wherein:
      ACT indicates whether the server is active (ACT=1) or inactive (ACT=0);
      IF indicates whether there is a failure (IF=1) or no failure (IF=0) at a server side of an interface between the server function and the client function, as determined at a server input driver within the client function; and
      ID indicates whether there is degradation (ID=1) or not degradation (ID=0) at the server side of the interface between the server function and the client function, as determined at the server input driver within the client function.

8. The invention of claim 7, wherein, if an (Active, Active) combination occurs, the client function selects the server function that changed state to Active most recently.

9. The invention of claim 7, wherein, if an (Active, Standby) combination occurs, the client function selects the server function whose state is Active.

10. The invention of claim 7, wherein, if an (Active, Degraded Active) combination occurs, the client function selects the server function whose state is Active.

11. The invention of claim 7, wherein, if an (Active, Degraded Standby) combination occurs, the client function selects the server function whose state is Active.

12. The invention of claim 7, wherein, if an (Active, Failed) combination occurs, the client function selects the server function whose state is Active.

13. The invention of claim 7, wherein, if a (Standby, Standby) combination occurs, the client function retains its previous selection.

14. The invention of claim 7, wherein, if a (Standby, Degraded Active) combination occurs:
   if the override condition is disabled, then the client function selects the server function whose status is Standby; and
   if the override condition is enabled, then the client function selects the server function whose status is Degraded Active.

15. The invention of claim 7, wherein, if a (Standby, Degraded Standby) combination occurs:
   if the override condition is disabled, then the client function selects the server function whose status is Standby; and
   if the override condition is enabled, then the client function retains its previous selection.

16. The invention of claim 7, wherein, if a (Standby, Failed) combination occurs:
   if the override condition is disabled, then the client function selects the server function whose status is Standby; and
   if the override condition is enabled, then the client function retains its previous selection.

17. The invention of claim 7, wherein, if a (Degraded Active, Degraded Active) combination occurs, the client function selects the server function that changed state most recently.

18. The invention of claim 7, wherein, if a (Degraded Active, Degraded Standby) combination occurs, the client function selects the server function whose state is Degraded Active.

19. The invention of claim 7, wherein, if a (Degraded Active, Failed) combination occurs, the client function selects the server function whose state is Degraded Active.

20. The invention of claim 7, wherein, if a (Degraded Standby, Degraded Standby) combination occurs, the client function retains its previous selection.

21. The invention of claim 7, wherein, if a (Degraded Standby, Failed) combination occurs:
   if the override condition is disabled, then the client function selects the server function whose status is Degraded Standby; and
   if the override condition is enabled, then the client function retains its previous selection.

22. The invention of claim 7, wherein the client function selects one of the server functions wherein:
   if an (Active, Active) combination occurs, the client function selects the server function that changed state to Active most recently;
   if an (Active, Standby) combination occurs, the client function selects the server function whose state is Active;
   if an (Active, Degraded Active) combination occurs, the client function selects the server function whose state is Active;
   if an (Active, Degraded Standby) combination occurs, the client function selects the server function whose state is Active;
   if an (Active, Failed) combination occurs, the client function selects the server function whose state is Active;
   if a (Standby, Standby) combination occurs, the client function retains its previous selection;
   if a (Standby, Degraded Active) combination occurs:
      if the override condition is disabled, then the client function selects the server function whose status is Standby; and
      if the override condition is enabled, then the client function selects the server function whose status is Degraded Active;
   if a (Standby, Degraded Standby) combination occurs:
      if the override condition is disabled, then the client function selects the server function whose status is Standby; and
      if the override condition is enabled, then the client function retains its previous selection;
   if a (Standby, Failed) combination occurs:
      if the override condition is disabled, then the client function selects the server function whose status is Standby; and
      if the override condition is enabled, then the client function retains its previous selection;
   if a (Degraded Active, Degraded Active) combination occurs, the client function selects the server function that changed state most recently;
   if a (Degraded Active, Degraded Standby) combination occurs, the client function selects the server function whose state is Degraded Active;
   if a (Degraded Active, Failed) combination occurs, the client function selects the server function whose state is Degraded Active;
   if a (Degraded Standby, Degraded Standby) combination occurs, the client function retains its previous selection; and if a (Degraded Standby, Failed) combination occurs:
   if the override condition is disabled, then the client function selects the server function whose status is Degraded Standby; and
   if the override condition is enabled, then the client function retains its previous selection.

23. The invention of claim 22, wherein:
   the override condition is enabled if automatic protection switching by the client function is to be disabled or if a forced switch is to be implemented by the control function;
   the override condition is disabled if automatic protection switching by the client function is to be enabled or if a manual switch is to be implemented by the control function;
   the control function is configured to receive a lockout command to disable all automatic protection switching, wherein, if lockout is enabled, the override condition is set to disable automatic protection switching by the client function;
   the system comprises two or more client functions, wherein each client function independently determines whether to select the working or protection server functions;
   the control function is unaware of configuration changes in the two or more client functions; and
   the status condition and the override condition are transmitted from each server to the client via in-band signaling.

24. The invention of claim 1, wherein each function is implemented on a different single circuit board.

25. The invention of claim 1, comprising two or more client functions, wherein each client function independently determines whether to select the working or protection server functions.

26. The invention of claim 25, wherein the control function is unaware of configuration changes in the two or more client functions.

27. The invention of claim 1, wherein 1+n protection is implemented using two or more working server functions and a single protection server function.

28. The invention of claim 1, wherein the status condition and the override condition are transmitted from each server to the client via in-band signaling.

29. The invention of claim 1, wherein each server function is implemented on two or more different circuit boards.

30. The invention of claim 1, wherein two or more control functions are implemented on two or more different circuit boards, wherein each control function defines a different protection plane.

31. The invention of claim 1, wherein 1+1 protection is implemented using distributed connectors.

32. A method for implementing protection switching in a system having a working server function, a protection server function, a client function, and a control function, comprising the steps of:
   (a) monitoring by the control function the health of the working and protection server functions for failures;
   (b) transmitting from the control function to each of the working and protection server functions (1) a status condition indicating whether the server function is active or standby and (2) an override condition;
   (c) transmitting from each of the working and protection server functions to the client function (1) the status condition and (2) the override condition;
   (d) monitoring by the client function the health of the working and protection server functions; and
   (e) implementing by the client function protection switching from the working server function to the protection server function based on the health, the status condition, and the override condition for each of the working and protection server functions.

33. The invention of claim 32, wherein:
   the override condition is enabled if automatic protection switching by the client function is to be disabled; and
   the override condition is disabled if automatic protection switching by the client function is to be enabled.

34. The invention of claim 32, wherein:
   the override condition is enabled if a forced switch is to be implemented by the control function; and
   the override condition is disabled if a manual switch is to be implemented by the control function.

35. The invention of claim 32, wherein the control function receives a lockout command to disable all automatic protection switching, wherein, if lockout is enabled, the override condition is set to disable automatic protection switching by the client function.

36. The invention of claim 32, wherein the client function determines whether each server function is healthy, degraded, or failed and the client function determines whether to select the working server function or the protection server function based on the health, the status condition, and the override condition of each server function.

37. The invention of claim 36, wherein a state is determined for each server function wherein:
   the state is standby when ACT=0, IF=0, and ID=0;
   the state is degraded standby when ACT=0, IF=0, and ID=1;
   the state is failed when IF=1;
   the state is active when ACT=1, IF=0, and ID=0; and
   the state is degraded active when ACT=1, IF=0, and ID=1, wherein:
      ACT indicates whether the server is active (ACT=1) or inactive (ACT=0);
      IF indicates whether there is a failure (IF=1) or no failure (IF=0) at a server side of an interface between the server function and the client function, as determined at a server input driver within the client function; and
      ID indicates whether there is degradation (ID=1) or not degradation (ID=0) at the server side of the interface between the server function and the client function, as determined at the server input driver within the client function.

38. The invention of claim 37, wherein the client function selects one of the server functions wherein:
   if an (Active, Active) combination occurs, the client function selects the server function that changed state to Active most recently;
   if an (Active, Standby) combination occurs, the client function selects the server function whose state is Active;
   if an (Active, Degraded Active) combination occurs, the client function selects the server function whose state is Active;
   if an (Active, Degraded Standby) combination occurs, the client function selects the server function whose state is Active;
   if an (Active, Failed) combination occurs, the client function selects the server function whose state is Active;
   if a (Standby, Standby) combination occurs, the client function retains its previous selection;

if a (Standby, Degraded Active) combination occurs:
  if the override condition is disabled then the client function selects the server function whose status is Standby; and
  if the override condition is enabled, then the client function selects the server function whose status is Degraded Active;
if a (Standby, Degraded Standby) combination occurs:
  if the override condition is disabled, then the client function selects the server function whose status is Standby; and
  if the override condition is enabled, then the client function retains its previous selection;
if a (Standby, Failed) combination occurs:
  if the override condition is disabled, then the client function selects the server function whose status is Standby; and
  if the override condition is enabled, then the client function retains its previous selection;
if a (Degraded Active, Degraded Active) combination occurs, the client function selects the server function that changed state most recently;
if a (Degraded Active, Degraded Standby) combination occurs, the client function selects the server function whose state is Degraded Active;
if a (Degraded Active, Failed) combination occurs, the client function selects the server function whose state is Degraded Active;
if a (Degraded Standby, Degraded Standby) combination occurs, the client function retains its previous selection; and
if a (Degraded Standby, Failed) combination occurs:
  if the override condition is disabled, then the client function selects the server function whose status is Degraded Standby; and
  if the override condition is enabled, then the client function retains its previous selection.

39. The invention of claim 32, comprising two or more client functions, wherein:
  each client function independently determines whether to select the working or protection server functions;
  the control function is unaware of configuration changes in the two or more client functions; and
  the status condition and the override condition are transmitted from each server to the client via in-band signaling.

* * * * *